Nov. 23, 1965 P. I. PRENTKY 3,219,353

MAGNETIC RECORDING MEDIUM

Filed Nov. 30, 1962

INVENTOR.
PETER I. PRENTKY
BY
Robert B. Crouch
ATTORNEY

United States Patent Office 3,219,353

Patented Nov. 23, 1965

3,219,353

MAGNETIC RECORDING MEDIUM

Peter I. Prentky, Los Gatos, Calif., assignor to International Business Machines Corporation, New York, N.Y., a corporation of New York Filed Nov. 30, 1962, Ser. No. 241,337
5 Claims. (Cl. 274—41.4)

The present invention relates to a magnetic recording medium for data storage and more particularly to a magnetic recording disk which permits maximum data storage efficiency.

In magnetic disk data storage devices, each recording surface is divided into concentric, circular tracks. A movable magnetic transducer is positioned to a preselected track location by an access arm under the control of an actuator or a servo system. Even though the known actuators and their associated linkages are precision machined, it is almost impossible to repeatedly position the transducer exactly over the center line of a desired track, due to the stack-up of mechanical tolerances in the actuator. To accommodate the slack due to tolerances of the actuator, the recording tracks on the disk must be spaced from each other. Since the tolerances may be as high as plus or minus (±) one-quarter track width, the center lines of adjacent tracks must be spaced from one and one-half to two track widths apart. Thus, one-third to one-half of the available recording surface of the disk must be allocated to actuator positioning errors, so that only one-half to two-thirds of the available surface is actually used for recording. In the case of servo systems, the transducer is servoed onto the desired track center line by means of servo signals which are interspersed with the data signals on the disk. Since the position of the transducer must be constantly corrected, the servo signals must be supplied continuously or at very frequent intervals. As a result, approximately one-quarter to one-half the recording surface must be devoted to servo signals, thus leaving only from one-half to three-quarters of the available recording surface of the disk to the actual recording of data.

The object of the present invention is to provide a magnetic recording disk having a high data storage efficiency and in which the entire usable surface area of the disk is available for recording data.

The above object is realized in the present invention by provision of a dual magnetic-layer disk in which two distinct layers of magnetic material of different coercivities are superimposed and separated by a thin layer of non-magnetic shielding material. With such a disk, track position servo signals can be stored in the high-coercivity lower magnetic layer and data signals written and rewritten in the low-coercivity upper layer. An access mechanism may be guided and controlled by the servo signals to position the transducer, so that very nearly the entire surface of the upper layer is available for recording data.

The foregoing and other objects, features and advantages of the invention will be apparent from the following more particular description of a preferred embodiment of the invention, as illustrated in the accompanying drawing.

Figure 1:
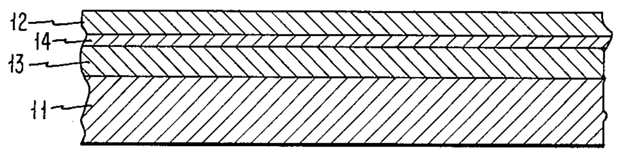
Figure 2:
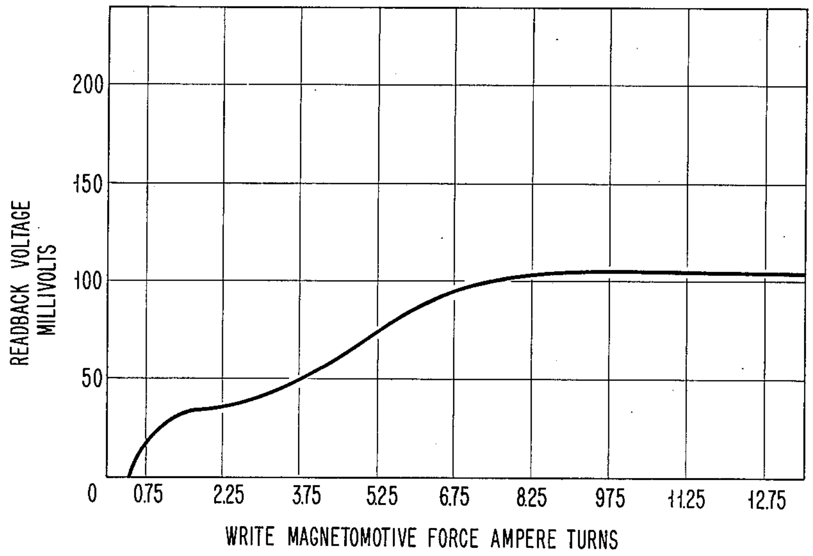

FIG. 1 is a partial elevation view in section of a disk according to the present invention, and FIG. 2 is a graph of the magnetic characteristics of a typical disk made according to the present invention.

As shown in FIG. 1, the magnetic recording disk of the present invention includes a supporting substrate 11 of non-magnetic material such as aluminum, brass, etc. Two magnetic layers of different coercivities, an upper layer 12 and a lower layer 13 are placed on the substrate and a layer 14 of a non-magnetic shielding material, such as copper, etc. separates the two magnetic layers. With this construction, one set of signals can be magnetically recorded in the upper layer 12 and a different set of signals magnetically recorded directly underneath in the lower layer 13. To make this dual layer recording effective, the two sets of signals must be individually recognizable and one must exist independently of the other. To be individually recognizable, the frequencies at which the two sets of signals are recorded must be sufficiently distinct to allow the two to be separated by filtering. This requirement can be met by recording the set of signals in the upper layer at a high frequency, at least three or four times the frequency of the other set of signals recorded in the lower layer. In addition, so that one set of signals may exist independently of the other, the coercivity of the lower layer must be considerably greater than that of the upper layer. This is to allow the set of signals recorded in the lower layer to remain undisturbed by subsequent writing and rewriting of the set of signals in the upper layer. The particular ratio of coercivities between the two layers will depend somewhat upon the types of information to be recorded, since the greater the ratio of coercivities the more indelible the lower layer becomes. In any case, the minimum effective ratio is approximately 5 to 1, whereas 8–10 to 1 would be a nominal ratio. The non-magnetic shielding layer 14 acts as a filter to attenuate the high frequency flux entering the lower layer and produces a more distinct saturation characteristic for the upper layer. Layer 14 also contributes to the indelibility of the lower layer since it increases the physical separation of the head from the lower layer.

Referring to FIG. 2 of the drawing, the saturation characteristic of a typical dual magnetic layer disk has been determined by writing with square wave current of varying amplitude at a constant frequency and then measuring the amplitude of the readback voltage. In the disk tested, the upper layer was 13 microinches thick and had a coercivity of approximately 130 oersteds, the intermediate layer was 2 microinches thick, and the lower layer was 180 microinches in thickness with a coercivity of approximately 1000 oersteds. As shown, the upper layer of the disk saturated at approximately 1.2 ampere turns while the lower layer saturated at approximately 6.75 ampere turns. A linear region of the lower layer is found between 1.5 ampere turns and 6.0 ampere turns. With proper D.C. biasing a low frequency signal may be linearly recorded in the lower layer. A high frequency signal is then saturate recorded in the upper layer. The saturation characteristics of the upper and lower layers can be used to determine the write and erase currents which would have a minimum effect on the signals recorded in the lower layer.

A particular application of this concept is that of obtaining position information for a track following position servo on a magnetic disk. To develop a track following servo, the position signal must show a measure of the distance off track and a sense or sign indicating direction. This position characteristic should have a null point where the data signals are to be written. To accomplish this, servo signals may be written on either side of the data tracks, so that the data track lies exactly between the servo signals. The servo signals are written such that they are read back with equal amplitude when the head is directly centered on the data track between them. Provision can be made to take the difference of these amplitudes, so that the net position characteristic is a maximum positive value over one servo signal decreasing to zero exactly half way between the two servo signals and increasing to a maximum negative value over the other servo signal.

In the dual layer disk of the present invention, low frequency servo signals may be written in the lower layer and high frequency data signals recorded in the upper layer directly above the null point between servo signals. The lower layer is written permanently at a frequency, or at a band of frequencies, whose upper limit is well below the lowest frequency contained in the upper layer. The upper layer may be written in any manner consistent with this restriction. For example, it may be written saturate recording with a self-clocking code, such as double frequency or phase modulation, or any other code in which a bit occurs in every bit period, and in which the reciprocal of the bit period is at least four times larger than the highest frequency in the lower layer.

When the dual magnetic layer disk of the present invention is employed in a track following servo application the servo signals would be permanently recorded in the lower layer and may be written during manufacture of the disk prior to the application of the intermediate or upper layers. If desired, the signals in the lower layer may be written through the upper and intermediate layers with a large magnetomotive force, e.g. with the transducer and lower layer coercivity used in the embodiment of FIG. 2, an M.M.F. of 5 ampere turns.

While the present invention has been illustrated in connection with a disk it is understood that it is also applicable to other type storage media, such as a magnetic drum or magnetic tape. In the latter case, the substrate would be non-metallic, i.e., Mylar or other suitable flexible media. The magnetic layers may be of any suitable composition, e.g. nickel cobalt, magnetic iron oxide, etc., and may be applied by any suitable process, e.g., electroplating, painting, spraying, etc.

While the invention has been particularly shown and described with reference to a preferred embodiment thereof, it will be understood by those skilled in the art that the foregoing and other changes in the form and details may be made therein without departing from the spirit and scope of the invention.

What I claim is:

1. A magnetic data recording medium comprising:
a non-magnetic substrate;

a layer of high coercivity magnetic material bonded to the substrate;
a layer of non-magnetic shielding material bonded to the high coercive material; and
a layer of low coercivity magnetic material bonded to the shielding material.

2. A magnetic data recording medium comprising:
a non-magnetic substrate;
a relatively thick layer of high coercivity magnetic material bonded to the substrate and adapted to store a first set of relatively low frequency magnetic signals;
a thin non-magnetic shield bonded to the high-coercivity layer; and
a layer of low coercivity magnetic material of intermediate thickness bonded to the shield for storing a second set of magnetic signals having a frequency of approximately three times that of the first set; the shield serving to magnetically isolate the high coercivity layer from the signals recorded in the low coercivity layer.

3. A magnetic recording medium as defined in claim 1 in which the ratio of coercivities of the two magnetic layers is a minimum of 5 to 1.

4. A magnetic recording medium as defined in claim 2 in which the ratio of coercivities of the two magnetic layers is a minimum of 5 to 1.

5. A magnetic recording medium as defined in claim 4 which includes servo tracks permanently recorded in the high coercivity layer.

References Cited by the Examiner

UNITED STATES PATENTS

| | | | |
|---|---|---|---|
| 2,517,440 | 8/1950 | Kleber | 274—41.4 |
| 2,590,091 | 3/1952 | Devol | 235—61.114 |
| 2,643,130 | 6/1953 | Kornei | 274—41.4 |
| 2,647,954 | 8/1953 | Howell | 274—41.4 |
| 2,853,402 | 9/1958 | Blois | 274—41.4 |

NORTON ANSHER, *Primary Examiner.*